US012499854B1

(12) United States Patent
Wu et al.

(10) Patent No.: US 12,499,854 B1
(45) Date of Patent: Dec. 16, 2025

(54) DISPLAY DRIVING CIRCUIT STRUCTURE WITH SPIKE REDUCTION

(71) Applicant: NOVATEK MICROELECTRONICS CORP., Hsinchu (TW)

(72) Inventors: Chia-En Wu, New Taipei (TW); Wei Ta Chiu, New Taipei (TW); Keko-Chun Liang, Hsinchu (TW); Yu-Hsuan Lai, Hsinchu County (TW); Tung-Hao Sung, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/966,862

(22) Filed: Dec. 3, 2024

(51) Int. Cl.
*G09G 5/10* (2006.01)

(52) U.S. Cl.
CPC ......... *G09G 5/10* (2013.01); *G09G 2330/021* (2013.01)

(58) Field of Classification Search
CPC ........................... G09G 5/10; G09G 2330/021
See application file for complete search history.

(56) References Cited

U.S. PATENT DOCUMENTS

| | | | | |
|---|---|---|---|---|
| 3,611,002 A * | 10/1971 | Wedam | H04N 3/20 | 348/730 |
| 7,471,344 B1 * | 12/2008 | Wakabayashi | G09G 1/002 | 348/707 |
| 8,405,592 B2 * | 3/2013 | Chiu | G09G 3/3688 | 345/94 |
| 2004/0212557 A1 * | 10/2004 | Koo | G09G 3/2965 | 345/60 |
| 2015/0145426 A1 * | 5/2015 | Zhong | H05B 45/39 | 315/192 |

* cited by examiner

*Primary Examiner* — Rodney Amadiz
(74) *Attorney, Agent, or Firm* — Rosenberg, Klein & Lee

(57) ABSTRACT

A display driving circuit structure with spike reduction is provided, comprising an operational amplifier circuit, a switching element and an output inductor. The operational amplifier circuit includes a first terminal receiving an input signal and an inverting terminal. The switching element has a first end electrically connected with the operational amplifier circuit and a second end opposite to the first end. The output inductor is electrically connected between the second end of the switching element and an output node, where an output signal is generated and provided. By employing the generated output signal to drive a display panel, the spike voltage of the output signal can be significantly reduced, and as a result, the operating temperature of the display panel can be effectively reduced by at least 4° C. It is believed that the present invention is beneficial to maintaining both low complexity and process cost of the driver ICs.

12 Claims, 7 Drawing Sheets

DISPLAY DRIVING CIRCUIT STRUCTURE WITH SPIKE REDUCTION

BACKGROUND OF THE INVENTION

Field of the Invention

The present invention is related to a channel output design for a driver integrated chip (IC). More particularly, the present invention is aimed to provide a novel display driving circuit structure which is characterized by having spike reduction, where an output inductance design is disposed therein, so as to reduce a spike voltage of the output signal for driving a display panel, and achieve in effectively cooling down operating temperatures of the display panel.

Description of the Prior Art

As known, in recent years, regarding a variety of display panel devices, it has been significantly proposed to improve its related manufacturing technologies, low power consumption, more efficient drivability of its driving means, high display quality as well as a large screen panel thereof. And therefore, it is apparent that in the current technologies, the display panel devices are being popularized, and application fields for these display panel devices are continuously expanding.

As referring to a currently existing display panel device, when regarding a detailed configuration of the display panel device, it has been known that the display panel device mostly includes a plurality of source driver integrated circuits (ICs) for supplying a data voltage to data lines of the display panel device, a plurality of gate driver ICs for sequentially supplying a gate pulse (or a scan pulse) to gate lines of the display panel device, and an optional timing controller for controlling the above-mentioned source driver ICs and the gate driver ICs, etc. More specifically, since a plurality of capacitors are commonly used as built components and disposed therein the driver ICs, when the capacitors are performing charging and/or discharging procedures, a spike (also known as a glitch) is usually inevitably generated. Due to the generated spike and/or glitch taking place, it results in an unfavorable rising temperature for the display panel device. In the related conventional arts, it has been known that a heat dissipation patch or additional adhesive would be used. However, such solutions are not practical and are hardly brought into real products, since additionally fabrication steps must be employed, and process complexity is therefore too high.

In another aspect, for people who has been familiar with the technical fields, increasing the heat dissipation layout area of the driver ICs becomes another possible option. Nevertheless, it still draws our attention that by employing such method, redundant process cost will be consuming with the demandingly increasing layout area of the driver ICs. On account of the above methodologies, several feasible manners have been discussed these days in the current technology and yet, challenges are still remained. Further improvements and alternative methodologies in the field are still to be expected.

From the designing points of view, in order to eliminate the spike which significantly influences the operating temperature of the display panel device, not only the total efficiency of the display panel device including high output current and high switching speed must be maintained, the electromagnetic interferences (EMIs) thereof have to be well controlled. As a result, it, in view of all, should be apparent and obvious that there is indeed an urgent need for the professionals in the field for a novel and inventive driver IC circuit to be proposed, and adapted to drive a display panel to be developed. By adopting the technical contents and solutions as provided in the following Application, it is aimed to avoid the above-mentioned issues in a way and maintaining a cool-down operating temperature of the display panel device at the same time.

SUMMARY OF THE INVENTION

In order to overcome the above-mentioned disadvantages, one major objective in accordance with the present invention is to provide a novel display driving circuit structure which is characterized by having spike reduction function. When the display driving circuit structure is adopted to drive the display panel device, it is believed that optimization of spike reduction efficiency as well as cooling down temperature of the display panel device can be both accomplished. Therefore, unexpected rising temperature generated in the display panel device can be effectively avoided, and at the same time, since the conventional heat dissipation patch and/or additional heat dissipation adhesives which were used in the typical display panel device, as previously mentioned in the prior arts can be omitted, redundant production cost can be significantly reduced by employing the technical solution disclosed by the present invention. In addition, there will be no longer necessary to design enlarged layout area of the driver ICs for heat dissipation. Layout complexity and cost for the driver ICs can also be well controlled and remain low. The present invention is effective and can be generally applied due to a plurality of merits.

As such, in view of the technical contents of the present invention, a display driving circuit structure with spike reduction is proposed in the following, involving with an inductor component disposed therein. According to the present invention, the disclosed display driving circuit structure with spike reduction comprises at least an operational amplifier circuit, a switching element and an output inductor. The operational amplifier circuit includes a first terminal which is adapted for receiving an input signal, and a second terminal. The second terminal of the operational amplifier circuit is an inverting terminal, coupled with an output terminal of the operational amplifier circuit. The switching element, for instance, can be a switch, which includes a first end and a second end, wherein the second end is disposed opposite to the first end. According to the embodiment of the present invention, the first end of the switching element is electrically connected with the output terminal of the operational amplifier circuit. And the second end of the switching element is further connected with the output inductor, such that the output inductor is disposed being electrically connected between the second end of the switching element and an output node, where an output signal will be provided and output. In practical, such output node can be further electrically coupled to a display panel, such that the output signal is applicable to driving the display panel. As such, when the output signal is provided to drive the display panel, a spike voltage of the output signal can be reduced and suppressed. And therefore, since the spike voltage of the output signal is significantly reduced, an operating temperature of the display panel can be found as being reduced by 4~5° C. Furthermore, according to a modified technical manner of the present invention, a resistor may be further disposed in the display driving circuit structure. Various and many alternatives as well as modifications will be apparent to those skilled in the art, once informed by the present disclosure. And yet, the present invention is certainly not limited thereto. It is believed that the present disclosure claims and covers the alternatives and modifications with equality.

These and other objectives of the present invention will become obvious to those of ordinary skill in the art after reading the following detailed description of preferred embodiments. And it is to be understood that both the foregoing general description and the following detailed description are exemplary and are intended to provide further explanation of the invention as claimed.

BRIEF DESCRIPTION OF THE DRAWINGS

The accompanying drawings are included to provide a further understanding of the present invention, and the drawings are incorporated in and also constitute a part of this specification. The drawings illustrate embodiments of the present invention and, together with the detailed description, are provided so as to serve to explain the principles of the present invention. In the drawings.

DESCRIPTION OF THE PREFERRED EMBODIMENTS

Figure 1:
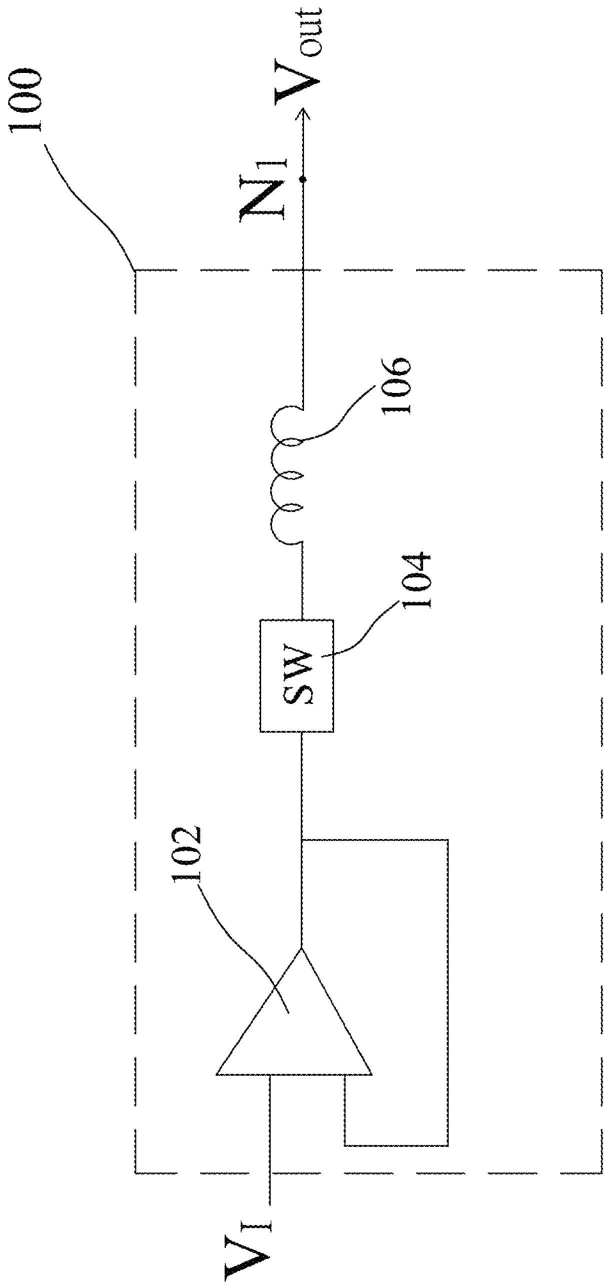
FIG. 1 shows a diagram schematically illustrating a display driving circuit structure with spike reduction in accordance with a first embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

In the following descriptions, a display driving circuit structure with spike reduction will be introduced. By employing the disclosed display driving circuit structure, it is applicable to driving a display panel. The display panel, for example, can be alternatively a display device having a Liquid Crystal Display (LCD) panel, an Organic Light Emitting Diode (OLED) display panel, or a Micro Light Emitting Diode (μLED) display panel, and etc. The provided display driving circuit structure is proposed as a source driver IC for driving the above listed display panel, and so as to achieve in reducing a spike voltage of an output signal for driving the display panel. In other words, by adopting the proposed display driving circuit structure with spike reduction for driving a display panel, it is believed that the conventional spike and glitch deficiencies occurred in the output voltage used for driving a display panel may be significantly suppressed and avoided. And as a result, an operating temperature of the display panel can be effectively reduced by 4~5° C.

At first, please refer to FIG. 1, which shows a diagram schematically illustrating a display driving circuit structure with spike reduction in accordance with a first embodiment of the present invention. As referring to the first embodiment in FIG. 1, the display driving circuit structure 100 is provided for being applicable to driving a display panel and achieves in reducing spike voltage of an output signal $V_{out}$.

According to the first embodiment of the present invention, the disclosed display driving circuit structure 100 comprises at least an operational amplifier circuit 102, a switching element 104 and an output inductor 106. The operational amplifier circuit 102 has a first terminal receiving an input signal $V_I$ and an inverting terminal as a second terminal. The inverting terminal is coupled with an output terminal of the operational amplifier circuit 102. Afterwards, the switching element 104 is successively in electrical connection with the operational amplifier circuit 102. In one embodiment, the switching element 104, for instance, can be a switch component, shown as "SW" in the figure. The switching element 104 as indicated, can be a two-end device, turning electric current on and off, or direct its flow.

According to the embodiment of the present invention, the switching element 104 has a first end electrically connected with the output terminal of the operational amplifier circuit 102 and a second end. According to the embodiment of the present invention, the second end of the switching element 104 is disposed opposite to the first end of the switching element 104. And the output inductor 106 is disposed as being electrically connected between the second end of the switching element 104 and an output node $N_1$, where the output signal $V_{out}$ is generated and provided.

As can be seen, when the output node $N_1$ is electrically coupled to a display panel, then the output signal $V_{out}$ is applicable to driving the display panel. The display panel, for instance, can be alternatively selected from a group consisting of a Liquid Crystal Display (LCD) panel, an Organic Light Emitting Diode (OLED) display panel, a Micro Light Emitting Diode (μLED) display panel and so on. The present invention is certainly not limited to the types of display panels, which the disclosed display driving circuit of the Application is applied to. As a result, when the output signal $V_{out}$ is generated and provided to drive the display panel, a spike voltage of the output signal $V_{out}$ can be effectively reduced and suppressed. And moreover, since the spike voltage of the output signal $V_{out}$ is reduced, it may also be relevant that an operating temperature of the display panel can be reduced by at least 4~5° C.

Figure 2:
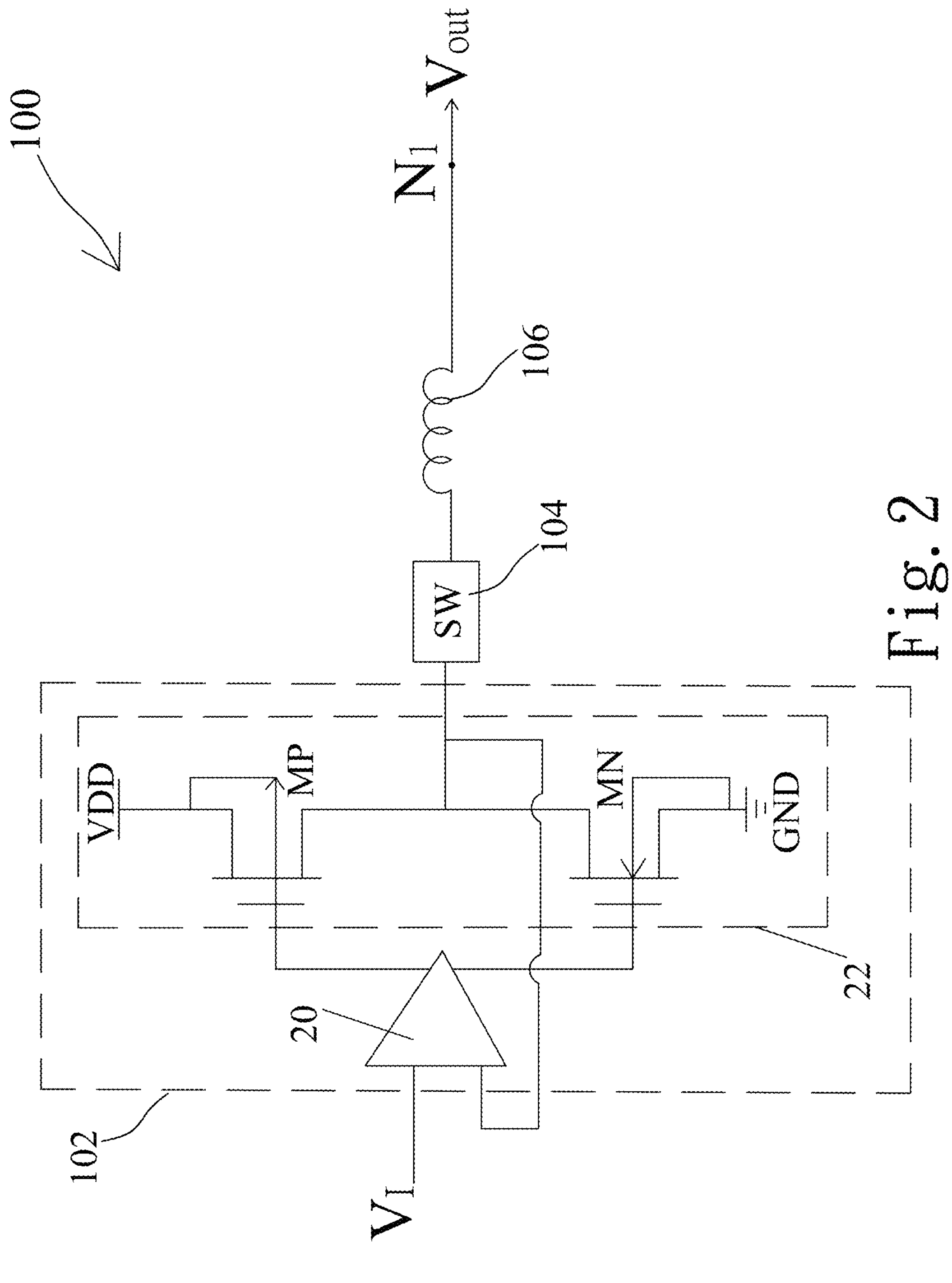
FIG. 2 shows a detailed layout diagram schematically illustrating the display driving circuit structure with spike reduction in accordance with the first embodiment of the present invention according to FIG. 1.

In addition, please refer to FIG. 2, which shows a detailed layout diagram schematically illustrating the display driving circuit structure 100 with spike reduction in accordance with the first embodiment of the present invention according to FIG. 1. As can be seen in FIG. 2, the disclosed operational amplifier circuit 102 specifically includes a source operational amplifier 20 and an output stage driver 22. According to the embodiment, the output stage driver 22 is supplied with a power voltage VDD and coupled to a ground terminal GND. And the output stage driver 22 is electrically connected between the source operational amplifier 20, the output terminal of the operational amplifier circuit 102 and the first end of the switching element 104.

As referring to FIG. 2, it can be seen that that the output stage driver 22 may comprise a P-type Metal-Oxide-Semiconductor Field Effect Transistor (PMOSFET) MP and an N-type Metal-Oxide-Semiconductor Field Effect Transistor (NMOSFET) MN, and the P-type Metal-Oxide-Semiconductor Field Effect Transistor MP and the N-type Metal-Oxide-Semiconductor Field Effect Transistor MN are electrically connected in cascade. The P-type Metal-Oxide-Semiconductor Field Effect Transistor MP is electrically connected with the power voltage VDD, the source operational amplifier 20 and the first end of the switching element 104, and the N-type Metal-Oxide-Semiconductor Field Effect Transistor MN is electrically connected with the ground terminal GND, the source operational amplifier 20 and the first end of the switching element 104. According to the embodiment of the present invention, the output stage driver 22 of the operational amplifier circuit 102 is a Complementary Metal Oxide Semiconductor (CMOS) that uses complementary and symmetrical pairs of p-type and n-type MOSFETs MP and MN for logic functions. Generally, the CMOS technology is used for constructing integrated circuit (IC) chips, including and not limited to microprocessors, microcontrollers, memory chips (including CMOS BIOS), and other digital logic circuits. CMOS technology has been also used for analog circuits such as image sensors (CMOS sensors), data converters, RF circuits (RF CMOS), and highly integrated transceivers for many types of communication. For people who are skilled in the arts and have ordinary knowledges, the related technical contents are therefore known and thus are not necessary to be described in the present invention.

Figure 3:
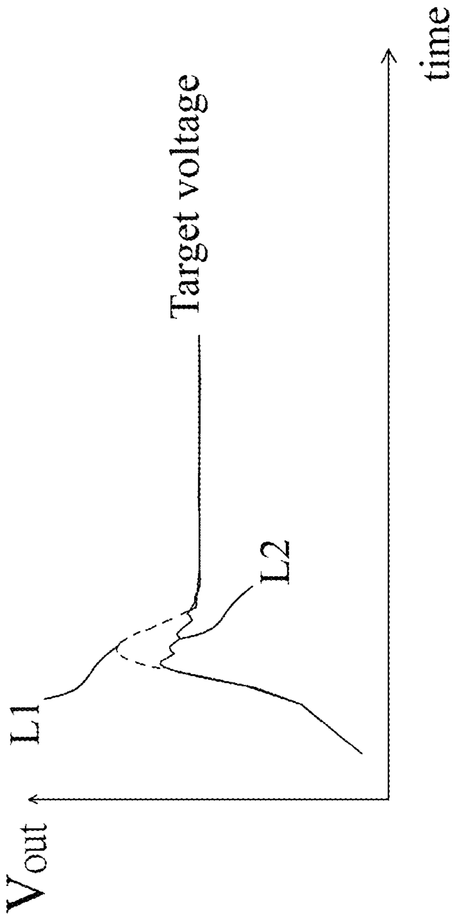
FIG. 3 illustratively shows a drawing of the waveform of the output signal $V_{out}$ in accordance with the embodiment of the present invention while compared with the prior arts.

Subsequently, please refer to FIG. 3, which illustratively shows a drawing of the waveform of the output signal $V_{out}$ in accordance with the embodiment of the present invention while compared with the prior arts. As can be seen from the waveforms in FIG. 3, the conventional output signal $V_{out}$ in the prior arts is indicated by the dash line L1, while the modified output signal $V_{out}$ when adopting the technical contents of the present invention is indicated by the solid line L2. Please refer to the two waveforms, and it is obvious that before the output signal $V_{out}$ reaches its stable target voltage, a sharp spike exists in the conventional output signal $V_{out}$ as illustrated in the dash line L1. However, on the contrary, since the present invention is applied to, where the disclosed display driving circuit structure is involved with an output inductor being configured therein, the spike voltage of the output signal $V_{out}$ is significantly reduced and suppressed, as shown in the solid line L2. As a result, it is believed that one major objective in accordance with the present invention is to successfully provide a novel display driving circuit structure which is characterized by having spike reduction function. And since the spike voltage of the output signal $V_{out}$ can be significantly avoided, it results in effectively reducing the operating temperature of the display panel which the display driving circuit structure is applied to drive, by at least 4° C.

Figure 4:
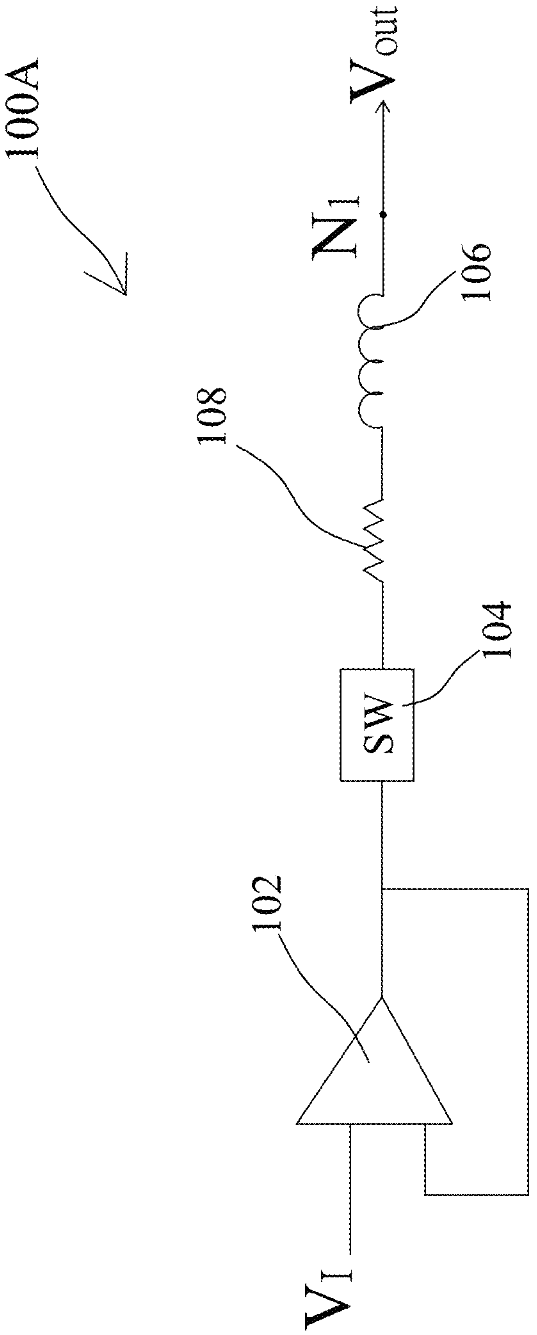
FIG. 4 shows a diagram schematically illustrating a display driving circuit structure with spike reduction in accordance with a second embodiment of the present invention, where a resistor is further disposed between the second end of the switching element and the output inductor.

In addition, in the following paragraphs, the Applicants of the present invention further provide a plurality of various and feasible implementations for achieving the same objectives of the present invention as effectively suppressing the spike voltage of an output signal which is used for driving a display panel. Please refer to FIG. 4, which shows a diagram schematically illustrating a display driving circuit structure with spike reduction in accordance with a second embodiment of the present invention. As referring to FIG. 4, the display driving circuit structure 100A is provided as well for being applicable to driving a display panel and achieves in reducing spike voltage of an output signal $V_{out}$.

In addition to the operational amplifier circuit 102, the switching element 104 and the output inductor 106 as previously introduced in the first embodiment in FIG. 1, the disclosed display driving circuit structure 100A in the second embodiment further comprises a resistor 108. And the resistor 108 is electrically in series connected with the switching element 104 and the output inductor 106, and the resistor 108 is specifically disposed between the second end of the switching element 104 and the output inductor 106.

Figure 5:
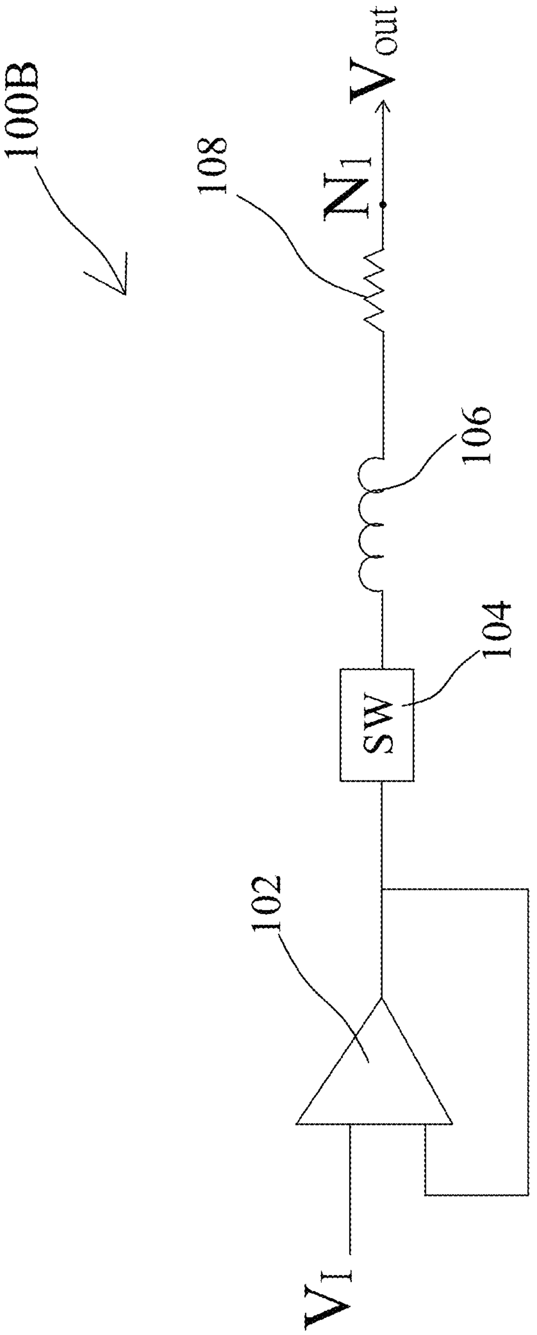
FIG. 5 shows a diagram schematically illustrating a display driving circuit structure with spike reduction in accordance with a third embodiment of the present invention, where a resistor is further disposed between the output inductor and the output node for outputting the output signal.

However, it should be noted that the configuration of the resistor 108 is certainly not limited to such layout manner. According to a third embodiment of the present invention, please refer to FIG. 5, in which the resistor 108 may also be alternatively disposed between the output inductor 106 and the output node $N_1$, such that the resistor 108 is electrically in series connected with the output inductor 106 for outputting the output signal $V_{out}$ and capable of reducing the spike voltage of the output signal $V_{out}$ according to the third embodiment of the disclosed display driving circuit structure 100B in FIG. 5.

Figure 6:
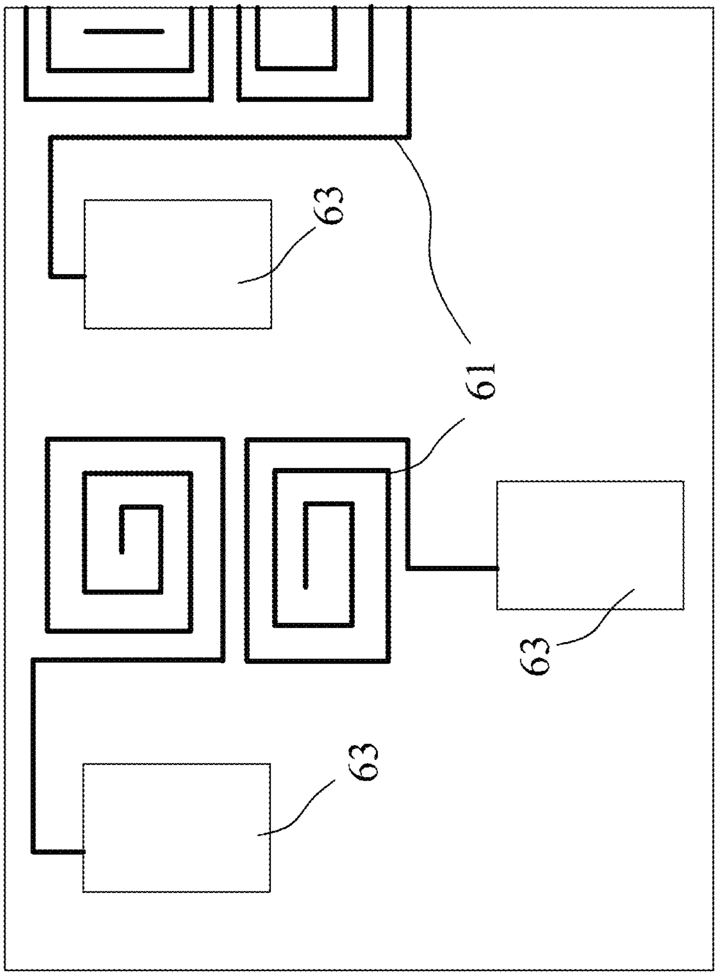
FIG. 6 schematically shows a top view of the layout configuration for forming the disclosed output inductor according to the embodiment of the present invention, wherein the plurality of wires are disposed as winding in a concentric shape pattern.

And furthermore, in another aspect, when regarding integrating the output inductor into the actual fabrication process of the display driving IC circuit, it is operable to use a plurality of wires which are winding for forming the disclosed output inductor. Please refer to FIG. 6, which schematically shows a top view of the layout configuration for forming the disclosed output inductor according to the embodiment of the present invention. As can be seen, the plurality of wires 61 can be disposed as winding in a concentric shape pattern, for example, in a square, a rectangle, an octagon, a polygon or the like, so as to form the disclosed output inductor there in between the pads 63 and internal circuit (not shown). An electrostatic discharge (ESD) protection may be further accomplished.

Figure 7:
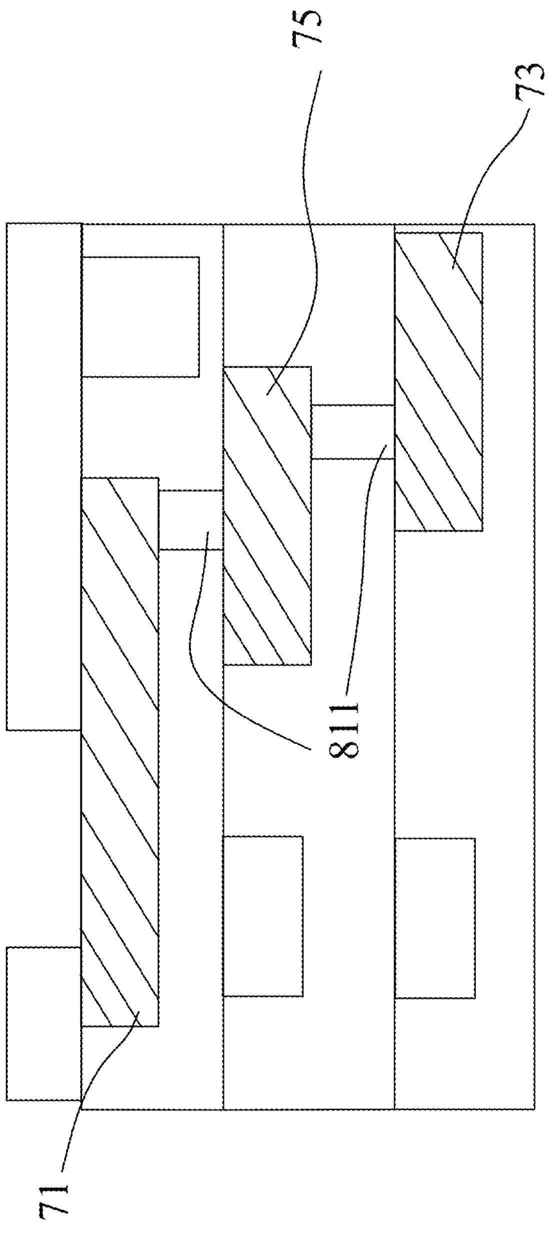
FIG. 7 schematically shows a cross sectional view of the layout configuration for forming the disclosed output inductor according to the embodiment of the present invention, wherein the plurality of winding wires can be alternatively configured using a same metal layer or different metal layers.

Moreover, FIG. 7 schematically shows a cross sectional view of the layout configuration for forming the disclosed output inductor according to the embodiment of the present invention. As can be seen, the plurality of winding wires can be alternatively configured using a same metal layer or different metal layers, wherein an upper metal layer 71, a lower metal layer 73 and an intermediate metal layer 75 may be involved and electrically connected by a plurality of inner vias 811. Alternatively, the disclosed configuration regarding the formation of the disclosed output inductor of the present invention, as provided hereinafter may also be applied depending on various circuit layouts as well as configurations. The present invention is not limited thereto, as it should be relevant to people who have ordinary knowledge and are skilled in the arts for practical implementations.

As a result, to sum up, it is believed that, according to the plurality of embodiments of the present invention which have been described in FIG. 1 to FIG. 7, a novel display driving circuit structure with spike reduction is provided and configured to be disposed as a source driver IC, so that the objective for spike reduction of its output voltage can be achieved in both a low cost and a low circuit area consumption criterion. At the same time, the present invention may also achieve in reducing the operating temperature of a display panel since the spike voltage of the driving voltage of the display panel is suppressed and avoided. As a result, it is believed that when the display driving circuit structure is adopted to drive a display panel device, optimization of spike reduction efficiency as well as cooling down temperature of the display panel device can be both accomplished. Thereby, it is ensured that the disclosed present invention is able to provide superior inventive effects while compared with the prior arts in the related technical backgrounds.

According to the present invention, the foregoing disclosed driver IC structures are proposed to be applied in a plurality of feasible ways, including an output inductor, and/or a resistor alternatively connected in a further way. And yet, alternative preferable components may also be compatible as well. As we know, once informed by people skilled in the related arts, various alternative and modification implementations and embodiments may also be established and will be apparent to those skilled in the art without departing from the spirits of the invention. And the present invention claims the same with equality. In other words, the present invention is certainly not limited to the above-disclosed configurations.

As a result, based on at least one embodiment provided above, it is believed that the proposed present invention is related to a channel output design for a source driver IC. It is particularly aimed to provide a novel display driving circuit structure which is characterized by having spike reduction, where an output inductance design is disposed therein. By such configurations, the present invention is beneficial to reduce a spike voltage of the output signal for driving a display panel, and achieve in effectively cooling down operating temperatures of the display panel.

As a result, on account of all, when compared to the prior arts, it should be obvious that the present invention apparently shows much more effective performances than before. In addition, it is believed that the present invention is instinct, effective and highly competitive for IC technology and industries in the panel device market nowadays, whereby having extraordinary availability and competitiveness for future industrial developments and being in condition for early allowance.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A display driving circuit structure with spike reduction, comprising:

an operational amplifier circuit, comprising a first terminal receiving an input signal, and a second terminal coupled with an output terminal of the operational amplifier circuit;

a switching element, comprising a first end electrically connected with the output terminal of the operational amplifier circuit and a second end, which is disposed opposite to the first end; and an output inductor, being electrically connected between the second end of the switching element and an output node, where an output signal is provided.

2. The display driving circuit structure with spike reduction according to claim 1, further comprising a resistor, wherein the resistor is electrically in series connected with the output inductor for outputting the output signal, and the resistor is disposed between the output inductor and the output node.

3. The display driving circuit structure with spike reduction according to claim 1, further comprising a resistor, wherein the resistor is electrically in series connected with the output inductor, and the resistor is disposed between the second end of the switching element and the output inductor.

4. The display driving circuit structure with spike reduction according to claim 1, wherein the output node is electrically coupled to a display panel, such that the output signal is applicable to driving the display panel.

5. The display driving circuit structure with spike reduction according to claim 4, wherein the display panel is selected from a group consisting of a Liquid Crystal Display (LCD) panel, an Organic Light Emitting Diode (OLED) display panel, and a Micro Light Emitting Diode (μLED) display panel.

6. The display driving circuit structure with spike reduction according to claim 4, wherein when the output signal is provided to drive the display panel, a spike voltage of the output signal is reduced and suppressed.

7. The display driving circuit structure with spike reduction according to claim 6, wherein when the spike voltage of the output signal is reduced, an operating temperature of the display panel is reduced by 4~5° C.

8. The display driving circuit structure with spike reduction according to claim 1, wherein the output inductor is formed, comprising a plurality of wires which are winding in a concentric shape pattern.

9. The display driving circuit structure with spike reduction according to claim 8, wherein the concentric shape pattern is selected from a group consisting of a square, a rectangle, an octagon, and a polygon.

10. The display driving circuit structure with spike reduction according to claim 8, wherein the plurality of wires are alternatively configured using a same or different metal layers.

11. The display driving circuit structure with spike reduction according to claim 1, wherein the operational amplifier circuit includes a source operational amplifier and an output stage driver, the output stage driver is supplied with a power voltage and coupled to a ground terminal, and the output stage driver is electrically connected between the source operational amplifier, the output terminal of the operational amplifier circuit and the first end of the switching element.

12. The display driving circuit structure with spike reduction according to claim 11, wherein the output stage driver comprises a P-type Metal-Oxide-Semiconductor Field Effect Transistor (PMOSFET) and an N-type Metal-Oxide-Semiconductor Field Effect Transistor (NMOSFET) which are electrically connected in cascade, the P-type Metal-Oxide-Semiconductor Field Effect Transistor is electrically connected with the power voltage, the source operational amplifier and the first end of the switching element, and the N-type Metal-Oxide-Semiconductor Field Effect Transistor is electrically connected with the ground terminal, the source operational amplifier and the first end of the switching element.

* * * * *